April 2, 1946.  G. E. TAYLOR  2,397,517
CRANKSHAFT HOLDING AND PIN ALIGNING MEANS
Filed March 22, 1944  2 Sheets-Sheet 1
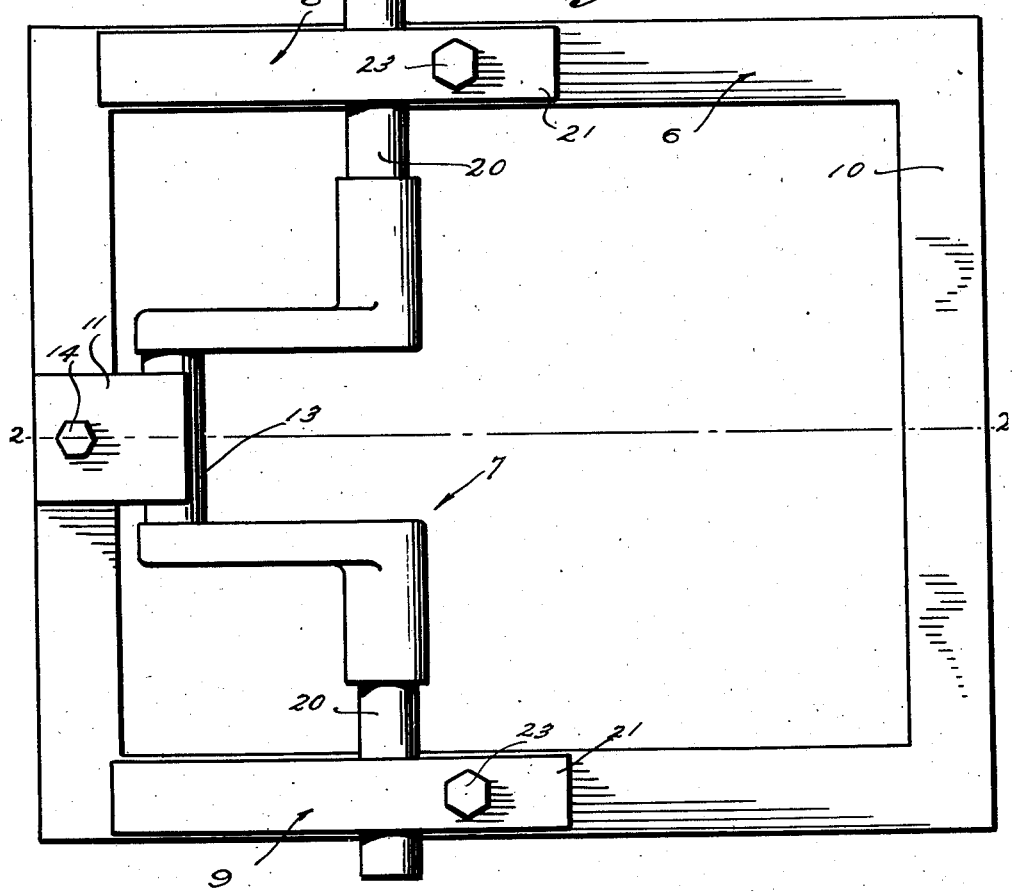
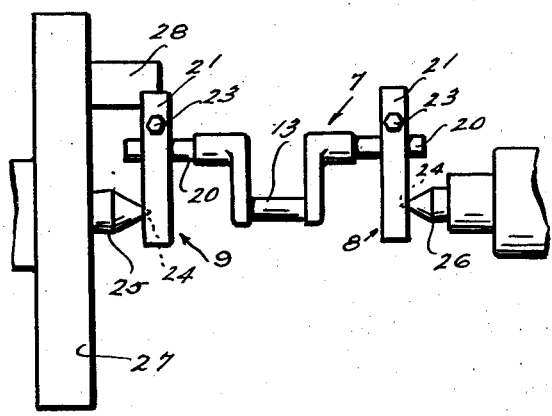
Inventor
Goldie E. Taylor.
By *Clarence A. O'Brien
and Harvey B. Jacobson*
Attorneys

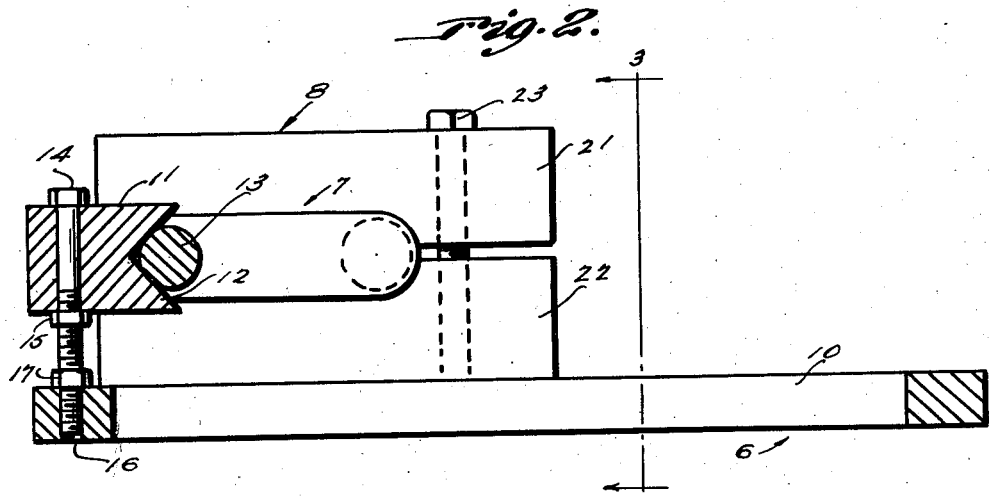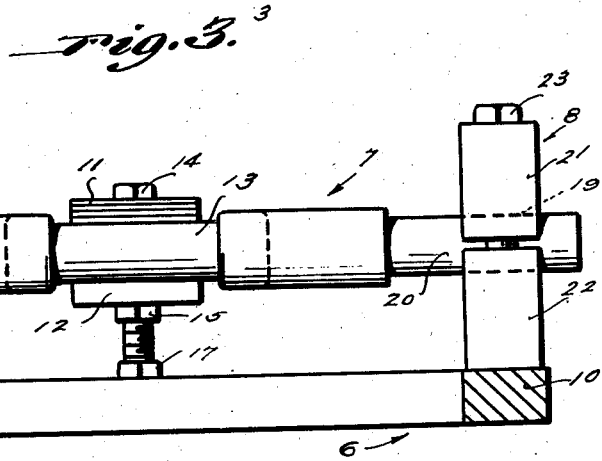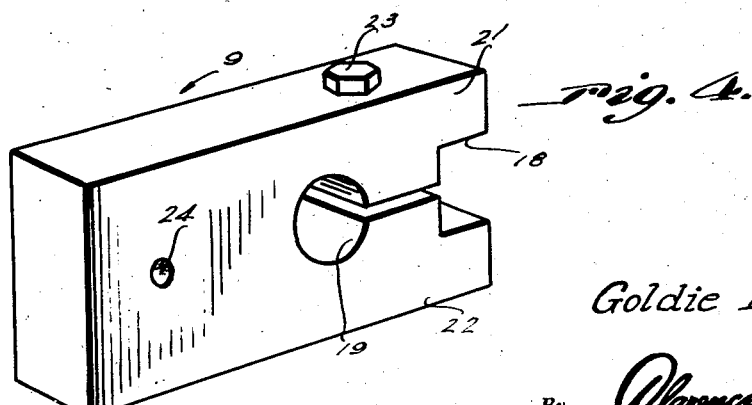

Patented Apr. 2, 1946

2,397,517

UNITED STATES PATENT OFFICE 2,397,517

CRANKSHAFT HOLDING AND PIN ALIGNING MEANS

Goldie E. Taylor, Portland, Oreg.

Application March 22, 1944, Serial No. 527,618

3 Claims. (Cl. 82—1)

This invention relates to novel structural means characterized by a multiple part assemblage, the design and construction of which provides means for holding and aligning a crank-pin to expedite subsequent machining and truing of the pin in a lathe.

More specifically, the invention, as a unitary assemblage, comprises a jig embodying a stationary platen having an adjustable crank-pin gauge and centering element, and a pair of parallel crankshaft retention and clamping blocks which are in effect templets and which, after the crank-pin is centered, are transported, with the crankshaft therebetween, to the lathe for machining and truing the crank-pin.

Under present-day methods of centering and machining crank-pins, considerable time and experience of skilled employees is involved. Bearing in mind, present-day requirements for conserving man-hours, this because of man-power shortages, all concerned are striving to evolve ways and means of increasing industrial output. Confronted with such contingencies, I have provided a novel structural arrangement of the aforementioned type which, it is believed, aptly fulfills the requirements of the trade and insures more successful and efficient results.

In carrying out the principles of the invention, I have adopted and utilized carefully chosen and coordinated expedients such as enable me to realize and achieve the aforementioned aims.

Other features and advantages of the invention will become more readily apparent from the following description and the accompanying illustrative drawings.

In the drawings, wherein like numerals are employed to designate like parts throughout the same:

Figure 1 is a top plan view of the crankshaft holding and clamping gauge blocks or templets and the underlying crank-pin aligning jig.

Figure 2 is a central longitudinal and vertical sectional view taken approximately on the plane of the line 2—2 of Figure 1.

Figure 3 is a transverse vertical sectional view on the plane of the line 3—3 of Figure 2.

Figure 4 is a perspective view of the left gauge block appearing at the left in Figure 3.

Figure 5 is a somewhat diagrammatic view, on a considerably reduced scale, showing the crankshaft and clamping and holding blocks mounted in a lathe about ready to be machined.

Referring now to the drawings by distinguishing reference numerals the jig, as a unit, is denoted by the numeral 6. The crankshaft is indicated at 7, and the gauge and clamping blocks are denoted by the numerals 8 and 9.

The jig comprises a substantially rectangular frame 10 in the form of a smooth platen. At one end is the crankpin locating and positioning guide 11. This is in the form of a block of appropriate dimensions having a V-shaped kerf 12 which receives and seats the crank-pin 13. This block is clamped between the head of the bolt 14 and the binding nut 15, the latter being on the threaded shank of the bolt. This shank is screwed into a screw-threaded hole 16 in the platen and is secured by a lock nut 17. Thus, the elevated position of the guide 11 is hand-regulated and adjusted.

The crankshaft clamping, support and gauge blocks 8 and 9 are also of general rectangular form. The blocks are duplicates except that the one indicated at 9 is provided in one end with a keeper notch 18 which serves the purpose to be hereinafter described. The blocks sit in parallelism on the plate or frame 10 as shown in the drawings. Keyhole slots are formed in corresponding ends and these define, at the inner ends, bearings 19 for the reduced journals 20 at opposite ends of the crankshaft. Also this formation provides resilient clamping jaws 21 and 22 which are adjusted toward and from each other by a clamping bolt 23 threaded through screw-threaded bores in the jaws 22 as shown in dotted lines in Figure 2. The outer face of each block is provided with a depression 24 which is precisely located at a predetermined point, this being for gauging and centering purposes. These depressions 24 serve not only as indicating markers for the central axis of the crank-pin 13, but as seats for the centering pins 25 and 26 on the lathe structure shown somewhat diagrammatically in Figure 5. It might be pointed out here that the lathe is shown as including the customary rotary disk 27 having a keeper or key 28 which fits into the driving on keeper notch 18 on the block 9. Suitable counterbalancing means (not shown) may also be mounted on the lathe disk or head 27.

The idea of the invention is to place the crank-pin 13 in exact axial alignment with the centering points 24 so that when the crankshaft and gauge blocks are transferred from the jig, all parts are in orderly alignment for truing and machining the crank-pin.

In practice, by placing the journals 20 of the crankshaft 7 in between the clamping jaws 21 and 22, the crankshaft and blocks, as an assembly, can be slid along the platen until the crank-pin 13 is lodged in the notch 12. The crank pin is held by hand in said notch 12 while the screws 23 are tightened. This guide 11 having been previously adjusted so that the vertex of the notch is in the proper plane with the centering point 24 in the gauge block, it is evident that the notch serves to horizontally locate and position the crank-pin. Then, the bolts 23 are tightened down to clamp the crankshaft, as a unit, between the blocks. The blocks are thus not only gauge or templet elements, but are holders as well. That is to say, the blocks in conjunction with the crankshaft, properly lined up, can be transported as an assembly to the lathe and placed between the center points 25 and 26 for properly machining and truing of the crank-pin.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a crankshaft holder and crank-pin structure of the class described, a jig comprising a platen forming frame, said frame being adapted to sit upon a relatively stationary support in a horizontal plane, a crankshaft center plane guide and abutment block having a V-shaped notch in one end for reception of the crank-pin, a bolt mounted perpendicularly at one end of the frame, said bolt passing down through said block and serving to adjustably support the block in parallelism above the underlying portion of the frame, and a clamping nut on the shank of the bolt engageable with the under side of the block for securely clamping the block in said position.

2. In a crankshaft holder and crank-pin structure of the class described, a jig comprising a platen forming frame, said frame being adapted to sit upon a relatively stationary support in a horizontal plane, a crankshaft center plane guide and abutment block having a V-shaped notch in one end for reception of the crank-pin, a bolt mounted perpendicularly at one end of the frame, said bolt passing down through said block and serving to adjustably support the block in parallelism above the underlying portion of the frame, a clamping nut on the shank of the bolt engageable with the under side of the block for securely clamping the block in said position, together with a lock-nut also on the shank of said bolt, said lock-nut being engageable with the adjacent surface of the frame.

3. A crankshaft holder and crank-pin centering structure of the class described, comprising, in combination, a base frame adapted to sit horizontally on a relatively stationary supporting surface, said frame constituting a platen, a bolt perpendicularly and adjustably mounted on the central portion of one of the end members of said frame, a crank-pin abutment and center plane finding block, said block being perpendicularly bored and adjustably mounted on the shank of the bolt, said block being provided at its inner end with a V-shaped notch for reception of the crank-pin, and crankshaft holding means shiftably and detachably mounted on the upper surface of said frame within the vicinity of said block, said means comprising a pair of parallel rectangular blocks, said blocks having clamping jaws at corresponding ends, and said jaws being adapted to receive the end portions of the crankshaft therebetween.

GOLDIE E. TAYLOR.